US012317375B2

(12) United States Patent
Thubert et al.

(10) Patent No.: US 12,317,375 B2
(45) Date of Patent: May 27, 2025

(54) DYNAMIC COMPRESSION CONTEXT IN A WIRELESS DATA NETWORK BASED ON APPLYING GENERIC NETWORK CONTEXT AND DEVICE-SPECIFIC CONTEXT TO A RULE TEMPLATE

(71) Applicant: Cisco Technology, Inc., San Jose, CA (US)

(72) Inventors: Pascal Thubert, Roquefort les Pins (FR); Huimin She, Shanghai (CN); Li Zhao, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 528 days.

(21) Appl. No.: 17/850,094

(22) Filed: Jun. 27, 2022

(65) Prior Publication Data
US 2023/0422023 A1    Dec. 28, 2023

(51) Int. Cl.
*H04W 8/30* (2009.01)
*H04W 4/70* (2018.01)
(Continued)

(52) U.S. Cl.
CPC ............... *H04W 8/26* (2013.01); *H04W 4/70* (2018.02); *H04W 80/04* (2013.01); *H04W 84/10* (2013.01); *H04W 88/16* (2013.01)

(58) Field of Classification Search
CPC ........ H04W 84/10; H04W 84/16; H04W 4/70
See application file for complete search history.

(56) References Cited

U.S. PATENT DOCUMENTS 7,778,235 B2    8/2010   Thubert et al.
10,856,170 B1   12/2020  Xia et al.
(Continued)

FOREIGN PATENT DOCUMENTS

WO    WO-2018165113 A1 *  9/2018  ............. H04L 69/04

OTHER PUBLICATIONS

3GPP TSG-RAN WG2 Meeting#98, R2-1705614 Title:Compression of UDC candidate solution under agreed metrices (Year: 2017).*
(Continued)

*Primary Examiner* — Faruk Hamza
*Assistant Examiner* — Abusayeed M Haque
(74) *Attorney, Agent, or Firm* — BEHMKE INNOVATION GROUP LLC; James M. Behmke; James J. Wong (57) ABSTRACT

In one embodiment, a method comprises: outputting, by a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and providing the generic network context to the wireless network devices, enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

20 Claims, 8 Drawing Sheets

(51) Int. Cl.
  *H04W 8/26* (2009.01)
  *H04W 80/08* (2009.01)
  *H04W 80/04* (2009.01)
  *H04W 84/10* (2009.01)
  *H04W 88/16* (2009.01)

(56) References Cited

U.S. PATENT DOCUMENTS

| | | | | |
|---|---|---|---|---|
| 2005/0083944 | A1* | 4/2005 | Liu | H04L 69/04 370/395.5 |
| 2007/0242683 | A1* | 10/2007 | Pelletier | H04W 28/06 370/401 |
| 2014/0177634 | A1* | 6/2014 | Jiang | H04L 45/74 370/392 |
| 2015/0172421 | A1* | 6/2015 | Stjernholm | H04W 92/20 370/328 |
| 2015/0373075 | A1* | 12/2015 | Perlman | H04L 65/762 709/217 |
| 2018/0278629 | A1* | 9/2018 | McGrew | H04L 63/1416 |
| 2020/0022022 | A1 | 1/2020 | Ly et al. | |
| 2020/0137628 | A1 | 4/2020 | Kandasamy et al. | |
| 2020/0389440 | A1 | 12/2020 | Zhao et al. | |
| 2021/0058478 | A1 | 2/2021 | Thubert et al. | |
| 2021/0110292 | A1 | 4/2021 | Minaburo et al. | |

OTHER PUBLICATIONS

Narten et al., "Neighbor Discovery for IP version 6 (IPv6)", Network Working Group, Request for Comments: 4861, Sep. 2007, [online], [retrieved on Jun. 3, 2022]. Retrieved from the Internet: URL: <https://www.rfc-editor.org/rfc/pdfrfc/rfc4861.txt.pdf>, pp. 1-97.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Mar. 29, 2018]. Retrieved from the Internet: URL: <https://tools.ietf.org/pdf/rfc6550.pdf>, pp. 1-157.

Thubert et al., "IPv6 over Low-Power Wireless Personal Area Network (6LoWPAN) Routing Header", Internet Engineering Task Force (IETF), Request for Comments: 8138, Apr. 2017, [online], [retrieved on May 10, 2022]. Retrieved from the Internet: URL: <https://www.rfc-editor.org/rfc/pdfrfc/rfc8138.txt.pdf>, pp. 1-37.

Minaburo et al., "SCHC: Generic Framework for Static Context Header Compression and Fragmentation", Internet Engineering Task Force (IETF), Request for Comments 8724, Apr. 2020, [online], [retrieved on May 10, 2022]. Retrieved from the Internet: URL: <https://www.rfc-editor.org/rfc/rfc8724.txt>, pp. 1-76.

Minaburo et al., "Static Context Header Compression (SCHC) for the Constrained Application Protocol (CoAP)", Internet Engineering Task Force (IETF), Request for Comments 8824, Jun. 2021, [online], [retrieved on May 10, 2022]. Retrieved from the Internet: URL: <https://www.rfc-editor.org/rfc/rfc8824.txt>, pp. 1-30.

Robles et al., "Using RPI Option Type, Routing Header for Source Routes, and IPV6-in-IPV6 Encapsulation in the RPL Data Plane", Internet Engineering Task Force (IETF), Request for Comments: 9008, Apr. 2021, [online], [retrieved on May 10, 2022]. Retrieved from the Internet: URL: <https://www.rfc-editor.org/rfc/rfc9008.txt>, pp. 1-56.

Gimenez et al., "Static Context Header Compression and Fragmentation (SCHC) over LoRaWAN", Internet Engineering Task Force (IETF), Request for Comments: 9011, Apr. 2021, [online], [retrieved on May 10, 2022]. Retrieved from the Internet: URL: <https://www.rfc-editor.org/rfc/rfc9011.txt>, pp. 1-27.

"User Guide—OpenSCHC Documentation", [online], [retrieved on May 24, 2022]. Retrieved from the Internet: URL: <https://openschc.github.io/openschc/General/User_guide.html>, pp. 1-5.

* cited by examiner

DYNAMIC COMPRESSION CONTEXT IN A WIRELESS DATA NETWORK BASED ON APPLYING GENERIC NETWORK CONTEXT AND DEVICE-SPECIFIC CONTEXT TO A RULE TEMPLATE

TECHNICAL FIELD

The present disclosure generally relates to dynamic compression context in a wireless data network based on applying a generic network context and a device-specific context to a rule template.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550, "RPL: IPv6 Routing Protocol for Low-Power and Lossy Networks". Each LLN node in the LLN typically is constrained by processing power, memory, and energy (e.g., battery power); interconnecting wireless links between the LLN nodes typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The Wi-SUN (Wireless Smart Utility Networks) alliance provides an interoperable wireless standards-based solution mainly for utility applications, such as distribution automation (DA). This kind of wireless data network is usually composed by multiple PANs (Personal Area Networks). Each PAN includes a border router (BR) as the gateway device and hundreds or thousands of wireless network nodes, forming a corresponding multi-hop wireless mesh network (also called a Low Power and Lossy Network). The wireless network nodes are connected through wireless links. The data network is managed by a Field Network Director (FND) which is located at a remote site (e.g., via a Wide Area Network)

Attempts to compress network traffic can be unscalable for large networks, particularly where a static context requires a set of one or more static context rules for each network device, as illustrated by Static Context Header Compression (SCHC) as defined in RFC 8724.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

In one embodiment, a method comprises: outputting, by a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

In another embodiment, one or more non-transitory tangible media are encoded with logic for execution by a machine and when executed by the machine operable for: outputting, by the machine implemented as a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

In another embodiment, an apparatus is implemented as a physical machine and comprises: non-transitory machine readable media configured for storing executable machine readable code; a device interface circuit; and a processor circuit. The processor circuit is configured for executing the machine readable code, and when executing the machine readable code operable for: outputting, by the apparatus implemented as a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

DETAILED DESCRIPTION

Particular embodiments enable scalable compression of wireless Internet Protocol (IP) packets prior to transmission between neighboring network devices in a wireless data network implemented, for example, as a personal area networks (PAN) or a Destination Oriented Directed Acyclic Graphs (DODAG), LPWAN, 6LoWPAN, etc., based on enabling a network device (e.g., a gateway device/root network device/border router or a wireless network device) to dynamically generate an executable rule set from a rule template, as opposed to storing multiple compression rules specifying static variables.

In particular, the use of Static Context Header Compression (SCHC) as defined in RFC 8724 requires that the values of the header fields are static, i.e., the values of the header fields (and the associated compression/decompression operations) do not change over time (see RFC 8724 at Sec. 1 on page 5). Hence, attempts to deploy SCHC as defined in RFC 8724 can suffer the problem of being unscalable for a gateway device/root network device/border router that is otherwise unable to store tens of thousands of sets of SCHC rules for respective tens of thousands of wireless LLN or 6LoWPAN nodes in a wireless data network. Further, a network device (e.g., wireless network device, root network device/border router, etc.) may have difficulty identifying which SCHC rule should be applied for compression/decompression.

According to example embodiments, each network device in the wireless data network can dynamically generate an executable rule set from a rule template. Each network device can generate the executable rule set based on inserting, into the rule template, one or more selected generic network-based context values, and/or device-specific values, for generation of an executable rule set that can be used by the corresponding network device for execution of compression/decompression operations on an IP data packet.

Figure 1:
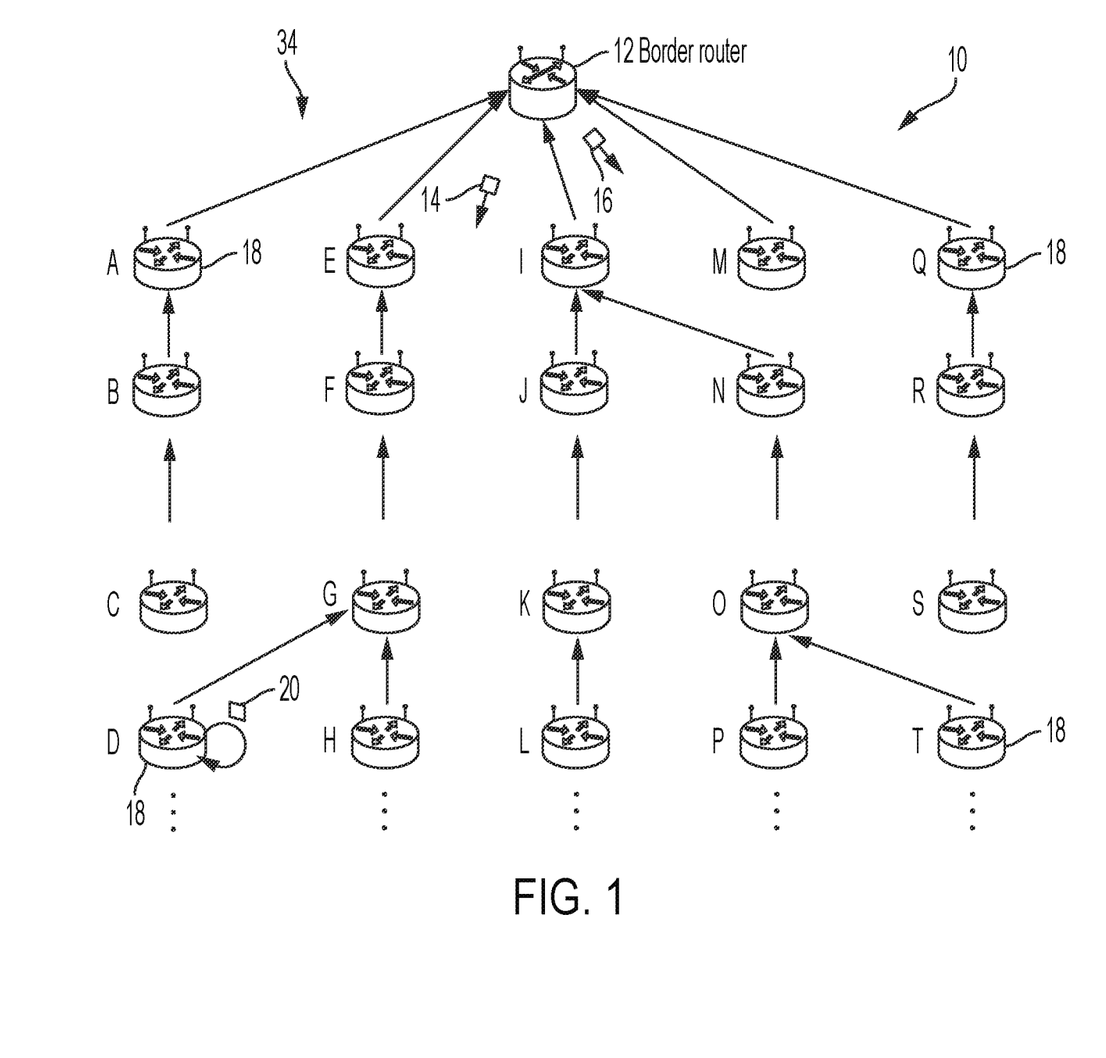
FIG. 1 illustrates an example data network (e.g., a Wi-SUN network) comprising a gateway device sending a rule template and a generic network context, causing each network device to execute the rule template for compression of a network protocol data packet based on the generic network context and a corresponding device-specific context, according to an example embodiment.

FIG. 1 illustrates an example data network (e.g., a Wi-SUN network) 10 comprising a gateway device (e.g., a root network device/border router/LoRA gateway, etc.) 12 that can output one or more rule templates 14 and one or more generic network context values (i.e., generic network contexts) 16 to wireless network devices 18. Each wireless network device 18 can receive and store each rule template 14 and each generic network context 16 that is transmitted via the wireless data network 10. The gateway device 12 and each wireless network device 18 (e.g., "D") also can store in its internal memory circuit (44 of FIG. 3) an associated set of device-specific values 20.

Figure 2:
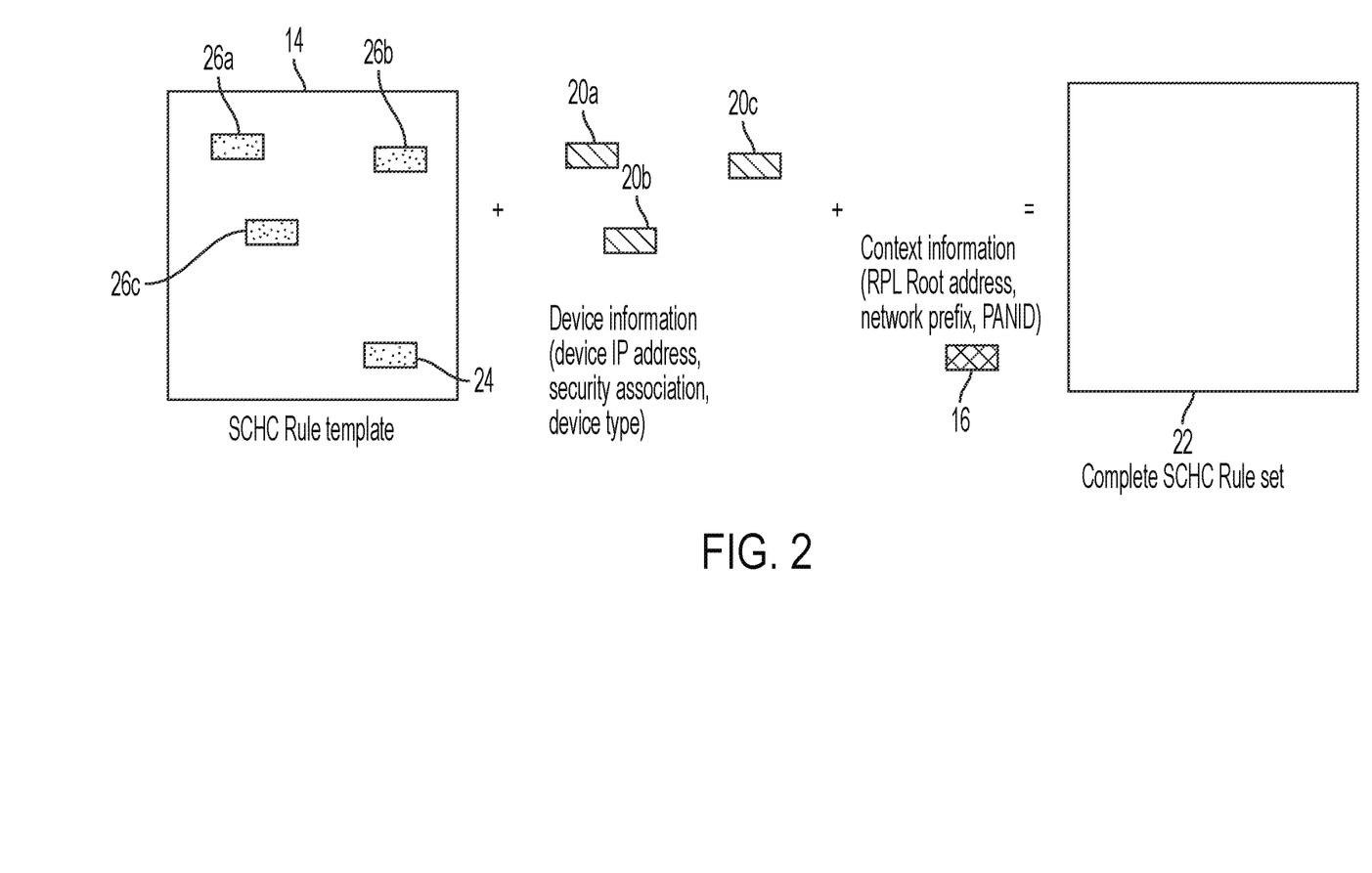
FIG. 2 illustrates an example insertion of a generic network context and a device-specific context into a rule template for device-specific execution of the compression, according to an example embodiment.
Figure 5:
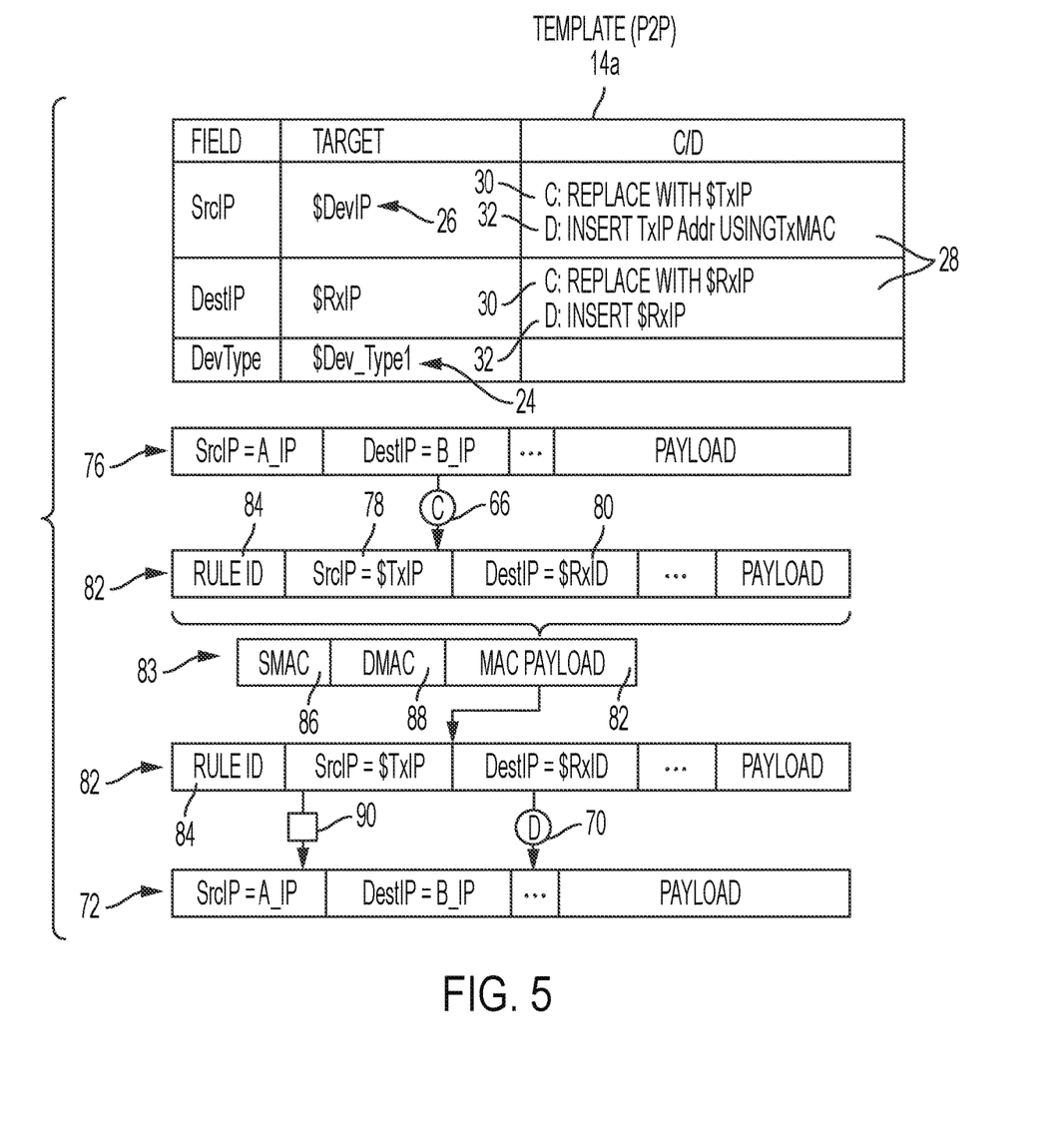
FIG. 5 illustrates an example execution of a rule template for compression of a data packet sent via peer-to-peer (P2P) communications between peer network devices, according to an example embodiment.
Figure 6:
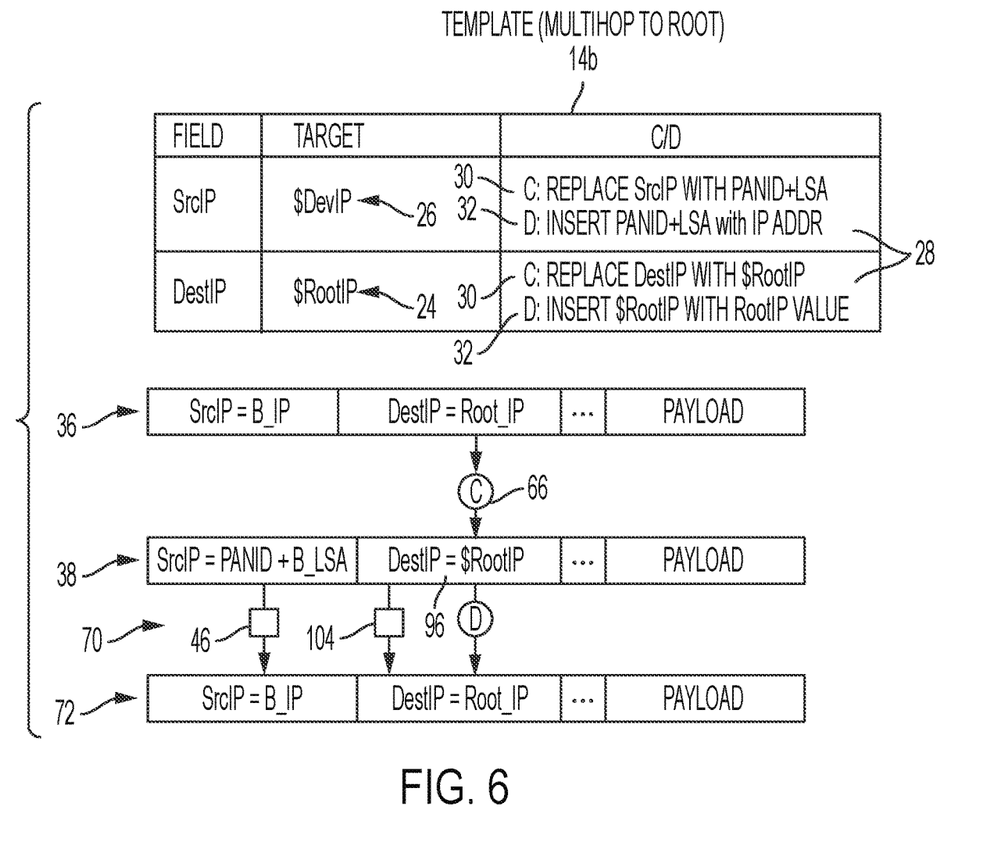
FIG. 6 illustrates an example execution of a rule template for compression of a data packet sent by a network device to the gateway device, according to an example embodiment.
Figure 7:
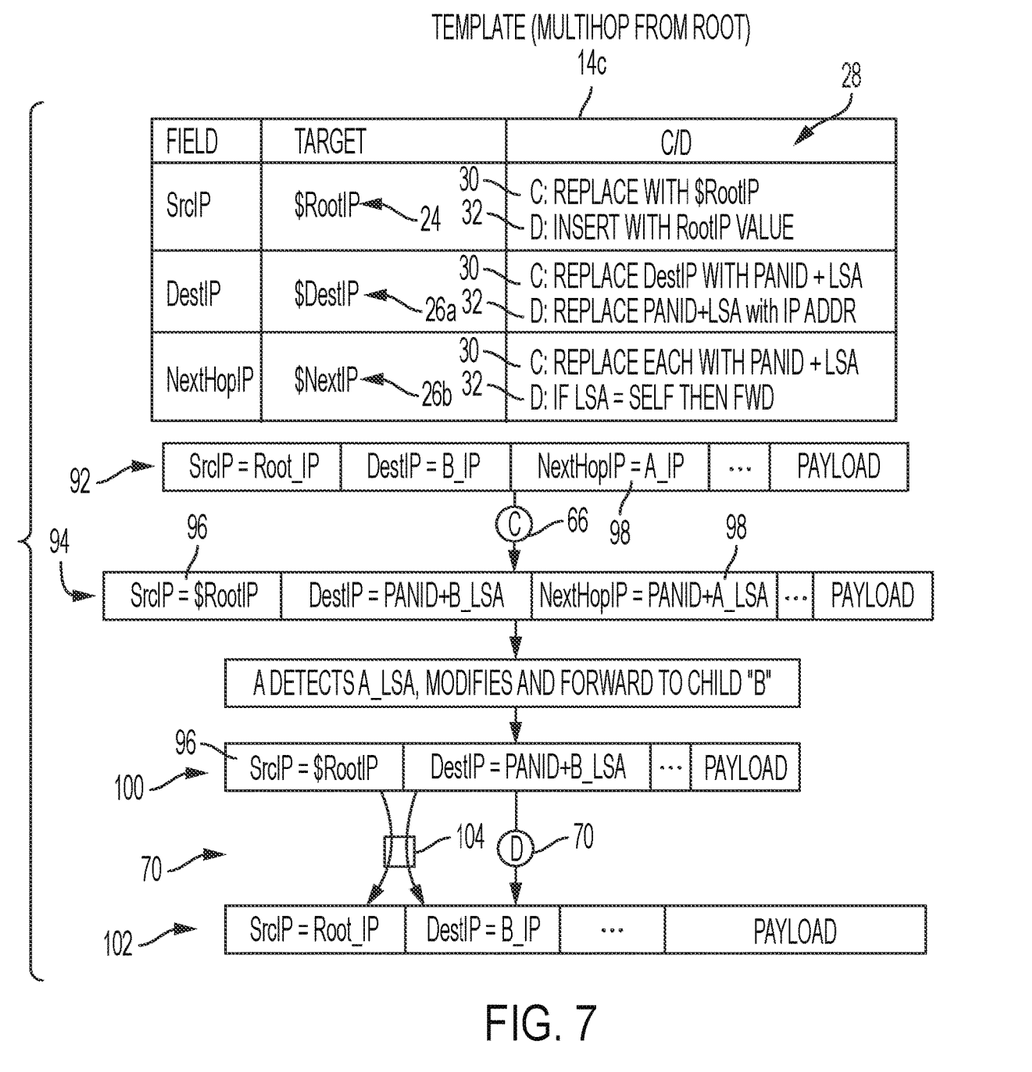
FIG. 7 illustrates an example execution of a rule template for compression of a data packet sent by the gateway device via a multi-hop path to a network device, according to an example embodiment.

FIG. 2 illustrates an example insertion, by the gateway device 12 and/or a wireless network device 18, of a generic network context 16 and a device-specific value 20 into a rule template 14 for generation of a complete executable rule set 22, for device-specific execution of the compression, according to an example embodiment. As illustrated in FIG. 2, the rule template 14 output by the gateway device 12 into the data network 10 can specify zero or more context variables 24, and/or zero or more device information variables 26, for example 26a, 26b, and 26c. As illustrated in FIGS. 5-7, each rule template 14 also can specify a compression rule 28 specifying a compression operation or instruction "C" 30 and a corresponding decompression operation "D" 32 specifying corresponding decompression instructions.

Hence, the supply of a rule template 14 and a generic network context 16 by the gateway device 12 enables each wireless network device 18 (and the gateway device 12) to dynamically generate a complete executable rule set 22 based on the associated wireless network device 18 (or the gateway device 12) inserting the appropriate generic network context 16 into the context variable 24 of the rule template 14, and inserting the appropriate device-specific values 20 into the respective device information variables 26.

As described below, the context variable 24 can identify a network context "tag" (e.g., 96 of FIG. 7) that is generic to multiple wireless network devices 18 in the wireless data network 10, for example PAN ID ("$PANID"), a root IP address ("$RootIP") of the gateway device 12 operating as a root network device for a directed acyclic graph (DAG) topology 34 according to the IETF RFC 6550, an IP address prefix ($DAG_PREFIX") used in at least a subset implemented as a subDAG of the DAG topology 34, topological device type ("$Dev_Type"), etc.

Similarly, the rule template 14 can include zero or more device information variables 26 (e.g., 78, 80 of FIG. 5) that identify zero or more "tags" for input of device-specific values 20, for example device IP address, security association (e.g., security key ID), available memory capacity, available battery capacity, device location (e.g., GPS coordinates), etc., as appropriate.

Hence, each wireless network device 18 (and/or the wireless network device 18) can dynamically generate its own specific complete executable rule set 22 based on inserting the appropriate generic network context 16 into the context variable 24 of the rule template 14, and inserting the appropriate device-specific value 20 into the appropriate device information variable 26 of the rule template 14. Each wireless network device 18 (and/or the wireless network device 18) can apply the dynamically-generated complete executable rule set 22 to an outgoing IP data packet (or incoming compressed packet) to determine whether there is a match between the dynamically-generated complete executable rule set 22 and the packet, and selectively execute a compression operation 30 and/or decompression operation 32 based on the determined match.

Hence, the example embodiments enable deployment of generic rule sets in large-scale networks, for example Wi-SUN networks, in a scalable manner that enables each network device 12, 18 to dynamically its own specific SCHC-based rule 22 based on a relevant generic network context 16 and its own device-specific context as identified by one or more device-specific values 20.

Although only wireless network devices "A", "D", "Q", and "T" 18 are labeled with the reference numeral "18" to avoid cluttering, it should be apparent that all the wireless network devices "A" through "T" are allocated the reference numeral "18". Further, although only the wireless network device "D" is illustrated as storing a device-specific value 20, it should be apparent that all the network devices (including the gateway device 12 and all the wireless network devices "A" through "18") 12, 18 can store their own respective sets of device-specific values 20.

The wireless data network 10 can be implemented as an Internet Protocol version 6 (IPv6) wireless radio frequency (RF) mesh network, deployed for example using wireless link layer protocols such as IEEE 802.15.4e, IEEE 802.15.4g (referred to herein as "IEEE 802.15.4e/g"), and/or IEEE 802.15.5. In particular, the wireless data network 10 can be implemented as a smart grid Advanced Metering Infrastructure (AMI) network that can utilize a connected grid mesh (CG-Mesh) that comprises a field area router (FAR) as the gateway device 12, where each wireless network device 18 can be implemented as a low power and lossy network (LLN) that can possibly reach, within its transmission range of its corresponding wireless data link, hundreds of neighboring wireless network device 18. The gateway device 12 can be implemented, for example, based on a commercially-available Cisco® Connected Grid Router (CGR) such as the CGR 1000 Series, commercially available from Cisco Systems, San Jose, California, modified as described herein. Hence, the gateway device 12 can also be referred to as a CGR, a DAG root, a DODAG root, or a root network device "CGR".

The gateway device 12 can implement the wireless data network 10 as "Personal Area Network" (PAN) having a prescribed PAN identifier (e.g., "PANID=4"). The gateway device 12, operable as a root network device, also can generate the DAG topology 34 based on outputting multicast DODAG information object (DIO) messages, for example according to RFC 6550, enabling the wireless network devices 18 to establish a DODAG rooted at the gateway device 12.

The wireless network devices 18 can be deployed, as part of an AMI network, within an urban environment as wireless outdoor devices (e.g., "poletop") devices deployed for forwarding network traffic to and from the gateway device 12.

Each wireless network device 18 in the wireless data network 10 normally can join a DODAG 12 in response to receiving a multicast message such as a DIG message via wireless data links (i.e., under normal wireless conditions providing reliable wireless data links). Each wireless network device 18 can be implemented as a constrained network device, or "LLN device" or "CG-mesh" device, configured for operating for example as a RPL node according to RFC 6550.

Each "child" network device (e.g., "A") 18 detecting the multicast DIG message output by the gateway device 12 can select the root network device (e.g., "Root" 16a) as a parent in the identified DODAG 34 based on comparing network topology metrics (advertised in the multicast DIG message) to a prescribed objective function of the RPL instance. The "child" network device (e.g., "A") 18, upon attaching to its parent, can output its own updated multicast DIG message with updated network topology metrics (e.g., rank identifier "Rank 1") that enable other wireless network devices 18 to discover the DODAG 12, learn the updated network topology metrics, and select a DODAG parent. Hence, the wireless network devices 18 can join the DODAG 34 in response to receiving a multicast DIG message from an advertising DODAG parent device, and selecting the DODAG parent as a default route.

Downward routes (i.e., away from the gateway device 12) can be created based on unicast Destination Advertisement Object (DAO) messages that are created by a wireless network device 18 and unicast transmitted to the gateway device 12 operating as a DAG root (hence also referred to herein as a DAG root 12). In RPL non-storing mode the wireless network devices 18 do not store downward routing tables, hence a wireless network device 18 operating as a RPL node can unicast its DAO message to the gateway device 12, such that all data packets are sent to the DAG root 12 and routed downward with source routes inserted by the DAG root 12.

Figure 3:
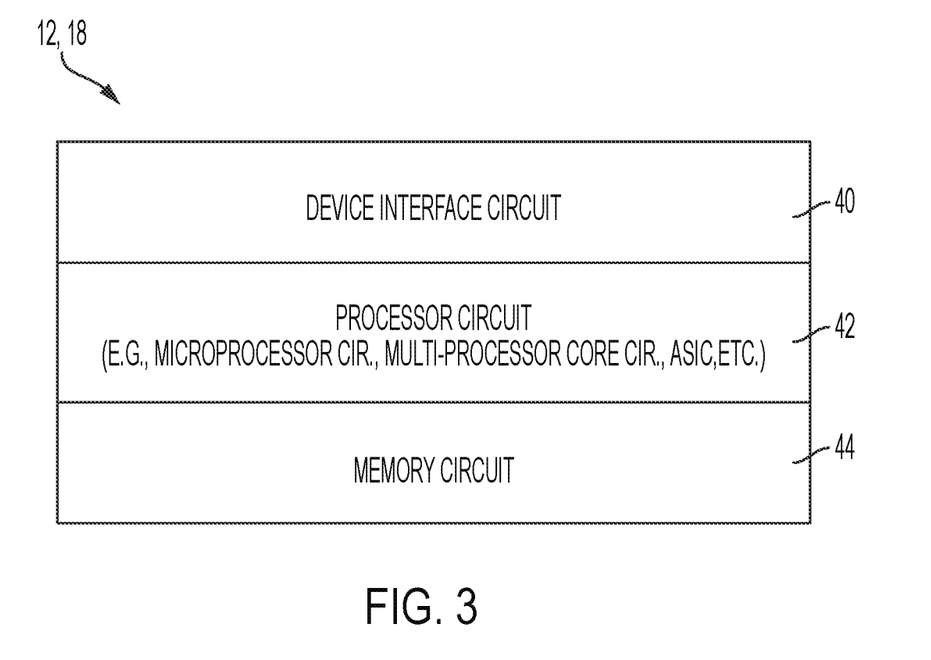
FIG. 3 illustrates an example implementation of any one of the network devices of FIG. 1, according to an example embodiment.

The DAG root 12, in response to receiving the DAO messages from the RPL nodes 18, can build the entire nonstoring DODAG topology 34 in accordance with RFC 6550, and store the DAG topology 34 in its memory circuit (44 of FIG. 3).

All the network devices 12, 18, can output a corresponding routing advertisement message (e.g., a DIO message). Further, all the wireless network devices 18 can have one or more attachments (illustrated in the Figures as lines in between the network devices 12, 18), where each attachment is used to illustrate an optimized next-hop path chosen for an identifiable objective function.

FIG. 3 illustrates an example implementation of any one of the devices 12 and/or 18 in any of the Figures, according to an example embodiment. Each apparatus 12 and/or 18 is a physical machine (i.e., a hardware device) configured for implementing network communications with other physical machines 12 and/or 18 via the physical data network 10 shown in the Figures. The term "configured for" or "configured to" as used herein with respect to a specified operation refers to a device and/or machine that is physically constructed and arranged to perform the specified operation.

Each apparatus 12 and/or 18 can include a device interface circuit 40, a processor circuit 42, and a memory circuit 44. The device interface circuit 40 can include one or more distinct physical layer transceivers for communication with any one of the other devices 12 and/or 18; for example, the device interface circuit 40 can include an IEEE 802.15.4e transceiver for wireless network communications, for example based on sending and receiving data packets via a wireless data link according to a prescribed wireless data link protocol. The processor circuit 42 can be configured for executing any of the operations described herein, and the memory circuit 44 can be configured for storing any data or data packets as described herein.

Any of the disclosed circuits of the devices 12 and/or 18 (including the device interface circuit 40, the processor circuit 42, the memory circuit 44, and their associated components) can be implemented in multiple forms.

Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
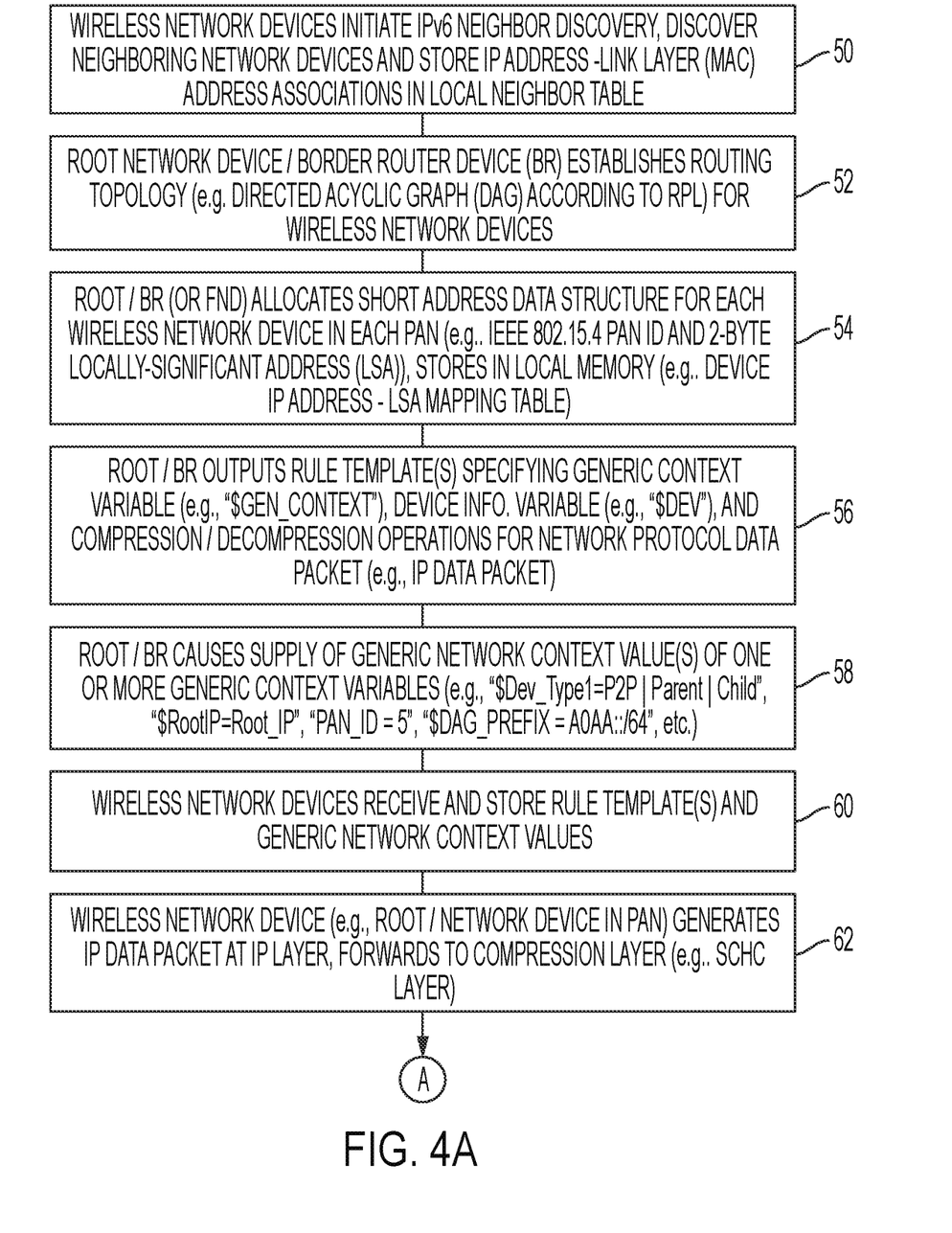
FIGS. 4A-4B illustrate an example method of a gateway device sending a rule template and a generic network context, and causing each network device to execute the rule template based on the generic network context and a corresponding device-specific context, according to an example embodiment.
Figure 4B:
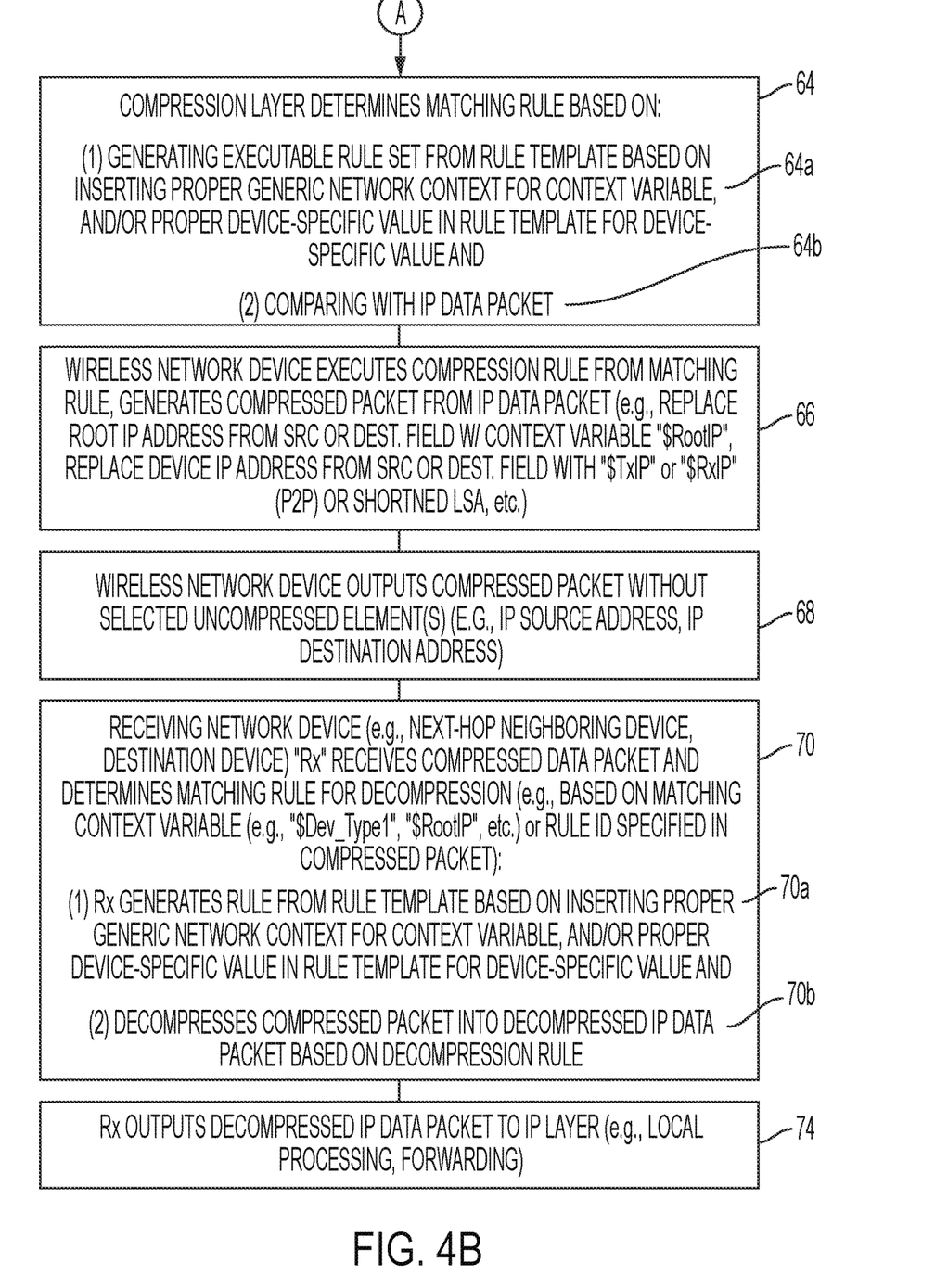

FIGS. 4A-4B illustrate an example method of a gateway device 12 sending a rule template 14 and a generic network context 16, and causing each wireless network device 18 to execute the rule template 14 as a competed rule set 22 based on the generic network context 16 and a corresponding device-specific context 20, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 42 of the gateway device 12 and each of the wireless network devices 18 in operation 50 can establish a link layer mesh network and initiate IPv6 neighbor discovery (e.g., according to RFC 4861), enabling the gateway device 12 and each wireless network device 18 to establish in its corresponding memory circuit 44 a local neighbor table (90 of FIG. 5) as a data structure that can store an IP address and a corresponding link layer (e.g., MAC) address for each of its neighbors. As described below, the local neighbor table enables the gateway device 12 and/or a wireless network device 18 to identify an IP address of a neighboring network device 12, 18 based on the corresponding link layer address of the neighboring network device 12, 18.

The processor circuit 42 of the gateway device 12 in operation 52 can establish an IP-based routing topology in the wireless data network 10, for example a DAG topology 34 according to RFC 6550 as described above. Hence, the processor circuit 42 of the gateway device 12 in operation 52 can establish a nonstoring-mode routing topology where the gateway device 12 can store a source-route path for reaching each wireless network device 18 in the DAG topology 34, without the necessity of any wireless network device 18 storing any routing information except for identification of a parent network device; the processor circuit 42 of gateway device 12 also can establish a storing-mode routing topology, where each wireless network device 18 can store identification of each parent network device and each attached child network device.

The processor circuit 42 of the gateway device 12 in operation 54 can establish and allocate in operation 54 a short address data structure for each wireless network device 18, for example based on combining a PAN ID of the wireless data network 10 with a two-byte locally-significant address (LSA) allocated to a corresponding wireless network device 18; hence, the processor circuit 42 of the gateway device 12 in operation 54 can effectively compress a 128-bit IPv6 address (or 32-bit IPv4 address) of a wireless network device 18 into a 24-bit (3 byte) or smaller compressed address comprising a PAN identifier (e.g., one byte) plus a two-byte LSA. As described below, each wireless network device 18 can store in its memory circuit 44 a device IP address LSA mapping table (46 of FIG. 6) that enables the wireless network device 18 to map between its IP address and its corresponding compressed address (comprising a PAN ID plus its two-byte LSA).

The processor circuit 42 of the gateway device 12 in operation 56 can output one or more rule templates 14, for example based on executing a link layer multicast, IP-based multicast or broadcast, etc., for reception by each of the wireless network devices 18. As described previously with respect to FIG. 2, each rule template 14 can comprise a context variable (e.g., "$GEN_CONTEXT" for a generic context variable), a device information variable (e.g., "$DEV" 26), and a compression rule 28 (illustrated in FIGS. 5-7) that specifies a compression operation 30 and a decompression operation 32. Each variable in the rule template 14 (including any context variable 24, any device information variable 26, any compression operation 30, and/or any decompression operation 32) can be implemented as a JavaScript Object Notation (JSON) object that is executed by the processor circuit 42 of a network device 12, 18 for retrieval of the relevant data value, described below.

The gateway device 12 in operation 58 also can provide, directly or indirectly (or "cause the supply of") one or more of the generic context values of one or more of the generic context variables to each of the wireless network devices 18 in the wireless data network 10. For example, the gateway device 12, as part of establishing a DAG topology 34 in operation 52, can output a DIO message that specifies its root IP address (e.g., "Root_IP") as a generic context identifying the DAG topology 34 by the root IP address, where "Root_IP" in this example represents a valid IPv6 address (e.g., "RootIP=2002::0001"). The gateway device 12 also can output a device type identifying different device types by topological role in the DAG topology 34, for example "$Dev_Type1=P2P|Parent|Child", where the device information variable "$Dev_Type1" 20 refers to a device type of a peer-to-peer device (P2P) type 20 for peer-based communications, a parent device type 20, or a child device type 20, etc. (the symbol "|" refers to an OR operand, i.e., the variable "$Dev_Type1" 20 can have a value of "P2P, "Parent" or "Child"). The gateway device 12 also can cause supply of a generic network context 16 in the form of broadcasting a PAN ID (e.g., "PAN_ID=5") for identification of the wireless data network 10 implemented as a personal area network. The gateway device 12 also can cause supply of a generic network context 16 in the form of the gateway device 12 or a subDAG root within the DAG topology 34 allocating a subnet prefix (e.g., $DAG_PREFIX=A0AA::/64") for use by children within the subDAG; hence, the gateway device 12 in operation 58 can provide a generic network context based on the gateway device 12 outputting an instruction that causes a subDAG root to supply its subnet prefix (as a generic network context value) to its subDAG children.

Hence, each wireless network device 18 in operation 60 receives the same one or more rule templates 14 output by the gateway device 12 in operation 56. Hence, each of the wireless network devices 18 in operation 60 can receive and store the one or more rule templates 14 and the one or more generic network contexts 16 in their corresponding memory circuits 44. The stored rule templates 14 and generic network contexts 16, in combination with the stored device-specific values 20, enable each network device 12, 18 to dynamically generate a complete executable rule set 22 in response to inserting the appropriate generic network context 16 into the context variable 24, and the appropriate device-specific value 20 into the appropriate device information variable 26. The dynamic generation of a complete executable rule set 22 based on applying a generic network context 16 and a device-specific value 20 to the rule template 14 enables each network device 12, 18 to identify the appropriate rule for compression of an IP data packet into a compressed packet, or decompression of a compressed packet into an IP data packet.

Consequently, any network device 12, 18 that generates in operation 62 an IP data packet at the IP layer can forward the IP data packet for compression at a compression layer (e.g., an SCHC layer) between the IP layer and the MAC layer.

Referring to FIG. 4B, the compression layer executed by the processor circuit 42 in any gateway device 12 or wireless network device 18 in operation 64 can determine a matching rule for compression of the received IP data packet from the IP layer. For example, the processor circuit 42 of the gateway device 12 or a wireless network device 18 in operation 64 can execute generation of a complete executable rule set 22 ("instantiate" a complete executable rule set 22) based on applying the relevant generic network context 16 and/or device-specific value 20 identified by the context variable 24 and/or the device information variable 26 in the associated rule template 14.

For example, a wireless network device 18 that is configured for P2P communications in a wireless mesh network 10 but that is not connected to any RPL-based routing topology 34 can ignore the rule template 14b of FIG. 6 based on a determined absence of any generic rule context 16 that maps to the context variable "$RootIP" 24 representing an IP address of a root network device; the wireless network device 18 configured for P2P communications can proceed with executing the rule template 14a of FIG. 5 (e.g., based on the generic context device type "$Dev_Type1=P2P" 24) to instantiate a complete executable rule set 22 based on the device-specific value (device IP address) 20 for the device information variable "$DevIP" 26.

In contrast, a wireless network device 18 belonging to the DODAG topology 34 can dynamically instantiate a complete executable rule set 22 using any one or more of the rule template 14a of FIG. 5 or the rule template 14b of FIG. 6 to determine in operation 64b a match between the generated IP data packet and the generated complete executable rule set 22. For example, the processor circuit 42 of a wireless network device (e.g., "B") 18 in operation 64a can instantiate a multi-hop to root network device rule set 22 based on inserting the root IP address "Root_IP" as a generic network context 16 for the context variable "$RootIP" 24 identified as a target for the destination address field in the rule template 14b. If in operation 64b the destination IP address in the generated IP data packet 36 matches the root IP address "Root_IP" inserted by the processor circuit 42 of the wireless network device 18 into the context variable "$RootIP" 24 (or alternately if the processor circuit 42 of the wireless network device 18 identifies a match with a device type "$Dev_Type1=Child"), the processor circuit 42 of the wireless network device 18 operation 66 can execute compression using the matching rule template 14b.

For example, the wireless network device 18 in operation 66 can execute one or more compression operations "C" 30 specified in the matching rule template 14b (and inherited by the instantiated complete executable rule set 22). As illustrated in FIG. 6, the compression operation 30s specified in the rule template 14b can cause the processor circuit 42 of the wireless network device 18 to replace the source IP address field value with the compressed address value for the wireless network device 18 (e.g., the PAN ID plus the two-byte LSA); the processor circuit 42 of the wireless network device 18 also can execute the compression operation 30 specifying replacement the destination IP address value (namely the IP address of the root network device) with the variable or "tag" "$RootIP" 96.

Hence, the processor circuit 42 of the wireless network device 18 in operation 66 can compress the IP data packet 36, into the compressed packet 38 containing no IP address, based on replacing the source IP address "B_IP" with its corresponding compressed address value, namely an (optional) PAN ID and the LSA "B_LSA" (the PAN ID can be optional if there is one and only one PAN ID used in the wireless data network 10), and further based on replacing the destination IP address "Root_IP" with the variable or tag "$RootIP" 96.

The processor circuit 42 of the originating network device (e.g., "B") 18 in operation 68 can output the compressed packet 38 to its MAC layer (e.g., executed in the device interface circuit 40) for wireless transmission of the compressed packet 38 via a wireless data link. As described previously, the compressed packet 38 output in operation 68 can be transmitted without selected uncompressed elements, for example without the source IP address "B_I" (representing a valid IPv6 address of the source network device "B" 18) or the destination IP address "Root_IP" (representing a valid IPv6 address of the destination root network device 12), resulting in a substantial reduction in the size of the transmitted compressed packet 38 relative to the IP data packet 36 generated by the transmitting wireless network device 18.

A neighboring receiving network device (e.g., "A") 18 in operation 70 can receive the compressed packet 38 and in response determine a matching rule template 14 for decompression. For example, the processor circuit 42 of the receiving network device "A" 18 can determine that the compressed packet 38 has a "$RootIP" tag 96 as a context variable 24 in the destination address field of its rule template 14 of FIG. 6. Hence, the processor circuit 42 of the receiving network device "A" 18 in operation 70a can instantiate the complete executable rule set 22 based on inserting the root IP address "Root_IP" in place of the context variable "$RootIP" 24, and determine that the compressed packet 38 is destined for the "root" gateway device 12. Hence, the receiving network device "A" 18 can determine it is not the destination network device, and therefore can forward the compressed packet 38 to its default parent according to RFC 6550.

The "root" gateway device 12 in operation 70 can respond to receiving the compressed packet 38 by determining the matching rule template 14b for decompression, based on determining that it has a "$RootIP" tag 96 as a context variable 24 in the destination address field of its rule template 14b of FIG. 6.

Hence, the processor circuit 42 of the root gateway device 12 in operation 70a can instantiate the complete executable rule set 22 based on inserting the root IP address "Root_IP" in place of the context variable "$RootIP" 24, and determine that it is the destination for the compressed packet 38 (the source address field target, namely the device information variable "$DevIP" 26, is a "don't care" in terms of generating the complete executable rule set 22). The processor circuit 42 of the root gateway device 12 in operation 70b can decompress the compressed packet 38 based on the corresponding decompression operation 32 specified in the matching rule template 14b, including replacing the PAN ID (if any) and the LSA "B_LSA" specified in the source address field with the corresponding IP address "B_IP" retrieved from a mapping table 46 using the combination of PAN ID and "B_LSA". The processor circuit 42 of the root gateway device 12 in root 70b also can retrieve its root IP address "Root_IP" from a local table entry 48 (e.g., for IP configuration settings) in the memory circuit 44, and replace the tag "$RootIP" 96 in the destination address field of the compressed packet 38 with the root IP address "Root_IP", resulting in the recovered destination address "Root_IP" for the decompressed IP data packet 72.

Hence, the compression/decompression layer executed by the processor circuit 42 of the root gateway device 12 in operation 74 can output the decompressed IP data packet 72 to the IP layer for IP layer processing by the root gateway device 12.

Hence, template-based compression and decompression can be executed by each network device 12, 18 in a scalable manner based on insertion of one or more context variables 24 (representing a generic network context) into a context variable 24, and one or more device-specific value 20c into a device information variable 26, for dynamic generation of a complete executable rule set 22 having the necessary device-specific parameters in with the appropriate network context.

As illustrated in FIG. 5, a P2P rule template 14a can be generated for P2P communications between neighboring network devices. As illustrated in FIG. 5, a transmitting network device (e.g., "A") 18 operating in P2P mode can determine that an IP data packet 76 matches the rule template 14a based on instantiating a complete executable rule set 22 by inserting the device IP address "IP_A" into the device information variable "$DevIP" 26 (and optionally a "P2P" device type in the "Dev_Type1" context variable 24 identifying the wireless network device "A" 18 is configured for P2P communications without use of any DAG topology 34).

In response to determining the complete executable rule set 22 generated based on the rule template 14a by the transmitting network device "A" 18 matches the IP data packet 76, the processor circuit 42 of the transmitting network device "A" 18 in operation 66 of FIG. 4B can compress the IP data packet 76 into a compressed P2P packet 82 based on removing the source IP address value "IP_A" (representing a valid IPv6 address for the wireless network device "A" 18), or replacing the source IP address value "IP_A" with a tag "$TxIP" 78, and removing/replacing the destination IP address value "IP_B" with a tag "$RxIP" 80. If desired, the compressed P2P packet 82 also can include a rule identifier field 84 if more than one rule template 14 is used (i.e., no Hence, the transmitting network device "A" 18 in operation 68 can transmit the compressed P2P packet 82 as a link layer packet 83 comprising a source link layer address 86 and a destination link layer address 88, for reception by the neighboring wireless network device "B" 18.

Hence, the neighboring wireless network device "B" 18 can execute the rule template 14a (e.g., based on device type "$Dev_Type1=P2P"), and recover in operation 70 the source IP address "IP_A" and destination IP address "IP_B" from its local neighbor table 90.

Referring to FIG. 7, the root gateway device 12 also can store a rule template 14c for multi-hop transmissions of an IP data packet 92 from the root gateway device 12 to a destination wireless network device 18 in the DAG topology 34. The rule template 14c can include a context variable 24 that references a root IP address for the DAG topology 34 within a source address field (e.g., "SrcIP=Root_IP") of the IP data packet 92, e.g., the IP address of the gateway device 12; the decompression operation 32 can use different root IP addresses for respective instances of a DAG topology 34 (not shown). The rule template 14c also can include a device information variable 26 that references a device network address of a destination wireless network device (e.g., "B") 18 (e.g., "DestIP=B_IP") within a destination address field of the compressed P2P packet 82.

Hence, the processor circuit 42 of the root gateway device 12 can determine the rule template 14c matches the IP data packet 92 based on instantiating a complete executable rule set 22 by inserting the locally-stored copy of the root network address into the context variable 24 of the rule template 14c, and comparing the root network address value for the source IP address field in the complete executable rule set 22 with the source IP address field in the compressed P2P packet 82 (the destination IP address field and the next hop address fields can be "don't care" in terms of matching the rule template 14c to the IP data packet 92).

Hence, the processor circuit 42 of the root gateway device 12 can complete generation of the complete executable rule set 22 by inserting the IP address field "DestIP=B_IP" from the IP data packet 92, inserting into the device information variable 26a, i.e., "$DestIP=B_IP", and optionally inserting one or more next-hop values "NextHop_IP=A_IP" into respective one or more device information variables 26, i.e., "$NextIP=A_IP".

Consequently, the processor circuit 42 of the root gateway device 12 can generate the compressed multi-hop packet 94 (destined for the wireless network device "B" via the wireless network device "A") by executing the compression rules 30 for the source IP address field, the destination IP address field, and the next-hop address field. In particular, the processor circuit 42 of the root gateway device 12 can replace the source IP address "Root_IP" with the "tag" "$RootIP" 96, the destination address "B_IP" with the PAN ID (optional) and the LSA "B_LSA" of the destination device "B" 18, and the next-hop address "A_IP" in the routing header 98 with the same PAN ID (optional) and the LSA "A_LSA" of the next-hop device "B" 18 (the optional PAN ID values and LSA values obtained from a local LSA mapping table 46 maintained by the root gateway device 12).

The next-hop device "A" 18 can respond to reception of the compressed multi-hop packet 94 based on detecting the matching rule template 14c for the received compressed multi-hop packet 94. The next-hop device "A" can match the rule template 14c based on the "$RootIP" tag 96 in the source address field in the compressed multi-hop packet 94 indicating the root network address variable matching the context variable "$RootIP" 24 in the rule template 14c. The next-hop device "A" can detect its locally-significant address "A_LSA" within its IEEE 802.15.4 address "PANID+A_LSA" and thus decompress the compressed multi-hop data packet 94 using the decompression operations 32 specified in the template. As apparent from the foregoing, different multi-hop templates 14 can be applied for modifying a routing header based on whether the next-hop is the destination, or whether the next-hop is another forwarding device.

Hence, the compression layer executed by the processor circuit 42 in the next-hop device "A" 18 can forward the decompressed IP data packet to its IP layer, causing the IP layer to update the routing header 98 for the next-hop destination device "B" 18. The compression layer executed by the processor circuit 42 in the next-hop device "A" can compress the updated IP data packet into the compressed packet 100.

As described previously the destination wireless network device "B" 18 can match the compressed packet 100 with the rule template 14c based on the "$RootIP" tag 96 in the source address field in the compressed multi-hop packet 94 matching the context variable "$RootIP" 24 in the rule template 14c. The processor circuit 42 of the destination wireless network device "B" 18 execute the decompression operations 32 specified in the rule template 14c for generation of the decompressed IP data packet 102 based on replacing its LSA address with its IP address "B_IP" from the PAN configuration table settings 104, and replacing the tag $RootIP in the compressed packet 100 with the root IP address "Root_IP" from its PAN configuration table settings 104.

According to example embodiments, one or more rule templates can be distributed throughout a large-scale wireless data network for customized execution by different wireless network devices, based on the wireless devices inserting a generic network context into a context variable of a rule template, and inserting a device-specific value into a device information variable of the rule template. The insertion of the generic network context and the device-specific value enables a wireless network device to dynamically generate a device-specific and context-appropriate SCHC rule set (22 of FIG. 2), without the necessity of storing multiple static rules. PAN configuration table settings 104.

Although the example embodiments have been illustrated with respect to compressing and decompressing one or more fields in an IP header, any other portion of the IP packet can be compressed as appropriate, including the entire IP header, any part or all of the UDP header, any part or all of a Constrained Application Protocol (CoAP) header, and/or part of the application payload. Moreover, various combinations of one or more context variables, one or more device information variables, and/or other variable types can be implemented within a rule template for multidimensional mappings to different contexts; for example, a message type can be added to a rule template 14, enabling a root network device having a specific root IP address and a destination device having a specific destination IP address to instantiate different complete rule sets for different variable types, e.g., message type, time domain type (e.g., month of year, day of week, hour of day, minute of hour, etc.), etc.

In addition, different rule templates can be deployed having different compression rules depending on context, where a particular value for a context variable, for a device information variable, or for another variable type can cause a different compression rule to be implemented; in other words, one of multiple compression rules in a rule template can be selected based on a corresponding value in any one of the variables implemented in the rule template.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   outputting, by a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and
   providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

2. The method of claim 1, wherein the generic network context includes a device type that identifies a device as a peer network device for peer-to-peer (P2P) network communications.

3. The method of claim 2, wherein the compression rule includes an instruction that causes a transmitting wireless network device to replace each IP address with a corresponding link-layer address for generation of a compressed data packet without any network address.

4. The method of claim 3, wherein:
the decompression rule causes a receiving wireless network device to recover, in response to receiving the compressed data packet from the transmitting wireless network device according to the P2P network communications, each IP address based on the corresponding link-layer address;
the receiving wireless network device having established an association between the IP address and the link-layer address of the transmitting wireless network device according to a prescribed neighbor discovery protocol.

5. The method of claim 1, wherein the generic network context includes any one or more of a root network address advertised by the gateway device, a personal area network (PAN) identifier, or a network address prefix allocated to at least a subset of the wireless network devices.

6. The method of claim 5, wherein:
the compression rule causes a transmitting network device to compress the network protocol data packet, destined for the gateway device, into a compressed packet based on replacing the root network address with the context variable representing the root network address, and replacing a corresponding network address of the transmitting network device with a locally-significant address allocated to the transmitting network device relative to an identifiable personal area network (PAN) identifier.

7. The method of claim 6, further comprising:
receiving, by the gateway device, the compressed data packet;
determining, by the gateway device, that the context variable in the compressed data packet matches the context variable in the rule template representing the root network address, and in response decompressing the compressed data packet based on recovering the root network address and the network address of the transmitting network device of the network protocol data packet.

8. The method of claim 1, wherein:
the context variable references a root network address within a source address field and the device information variable references a device network address of a destination wireless network device within a destination address field;
the method further comprising the gateway device retrieving a locally-stored copy of the root network address and inserting into the rule template; and
the gateway device compressing the network protocol data packet into a compressed packet, according to the rule template, based on determining the source address field of the network protocol data packet matches the locally-stored copy of the root network address inserted into the rule template.

9. The method of claim 8, wherein the compressing includes:
replacing the root network address in the source address field with the context variable based on the compression rule;
replacing a destination address of the destination wireless network device in a destination address field with a locally-significant address of the destination wireless network device, including retrieving the locally-significant address of the destination wireless network device from a local data structure;
the method further comprising the gateway device outputting the compressed packet based on executing the compression operation specified in the rule template.

10. The method of claim 1, further comprising:
generating by the gateway device, based on the rule template, an executable rule set based on replacing the context variable with a root network address in response to the context variable indicating a root network address variable;
obtaining, by the gateway device, the device-specific value for the device information variable from a prescribed field of the network protocol data packet specified in the rule template, for execution of the executable rule set on the network protocol data packet.

11. One or more non-transitory tangible media encoded with logic for execution by a machine and when executed by the machine operable for:
outputting, by the machine implemented as a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation; and
providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

12. The one or more non-transitory tangible media of claim 11, wherein the generic network context includes a device type that identifies a device as a peer network device for peer-to-peer (P2P) network communications.

13. The one or more non-transitory tangible media of claim 12, wherein the compression rule includes an instruction that causes a transmitting wireless network device to replace each IP address with a corresponding link-layer address for generation of a compressed data packet without any network address.

14. The one or more non-transitory tangible media of claim 11, wherein the generic network context includes any one or more of a root network address advertised by the gateway device, a personal area network (PAN) identifier, or a network address prefix allocated to at least a subset of the wireless network devices.

15. The one or more non-transitory tangible media of claim 14, wherein:
the compression rule causes a transmitting network device to compress the network protocol data packet, destined for the gateway device, into a compressed packet based on replacing the root network address with the context variable representing the root network address, and replacing a corresponding network address of the transmitting network device with a locally-significant address allocated to the transmitting network device relative to an identifiable personal area network (PAN) identifier.

16. The one or more non-transitory tangible media of claim 15, further operable for:
receiving, by the gateway device, the compressed data packet;
determining, by the gateway device, that the context variable in the compressed data packet matches the context variable in the rule template representing the root network address, and in response decompressing the compressed data packet based on recovering the root network address and the network address of the transmitting network device of the network protocol data packet.

17. The one or more non-transitory tangible media of claim 11, wherein:
the context variable references a root network address within a source address field and the device information variable references a device network address of a destination wireless network device within a destination address field;
the one or more non-transitory tangible media further operable for:
retrieving a locally-stored copy of the root network address and inserting into the rule template, and
compressing the network protocol data packet into a compressed packet, according to the rule template, based on determining the source address field of the network protocol data packet matches the locally-stored copy of the root network address inserted into the rule template.

18. The one or more non-transitory tangible media of claim 17, wherein the compressing includes:
replacing the root network address in the source address field with the context variable based on the compression rule;
replacing a destination address of the destination wireless network device in a destination address field with a locally-significant address of the destination wireless network device, including retrieving the locally-significant address of the destination wireless network device from a local data structure;
the one or more non-transitory tangible media further operable for outputting the compressed packet based on executing the compression operation specified in the rule template.

19. The one or more non-transitory tangible media of claim 11, further operable for:
generating, based on the rule template, an executable rule set based on replacing the context variable with a root network address in response to the context variable indicating a root network address variable;
obtaining the device-specific value for the device information variable from a prescribed field of the network protocol data packet specified in the rule template, for execution of the executable rule set on the network protocol data packet.

20. An apparatus implemented as a physical machine, the apparatus comprising:
non-transitory machine readable media configured for storing executable machine readable code;
a device interface circuit; and
a processor circuit configured for executing the machine readable code, and when executing the machine readable code operable for:
outputting, by the apparatus implemented as a gateway device in a wireless data network comprising wireless network devices, a rule template for execution by any of the wireless network devices, the rule template comprising a device information variable for insertion of a device-specific value by a corresponding wireless network device executing the rule template, a context variable for insertion, by the wireless network devices, of a generic network context, and a compression rule specifying a compression operation and a corresponding decompression operation, and
providing the generic network context to the wireless network devices, the rule template and the generic network context enabling each wireless network device to selectively execute the rule template, for execution of one of the compression operation on a network protocol data packet or the corresponding decompression operation for recovery of the network protocol data packet, based on the insertion of the corresponding device-specific value for the device information variable.

* * * * *